June 21, 1932.  M. PIER  1,863,670
PRODUCION OF VISCOUS OILS AND HYDROCARBON PRODUCTS OF LOW BOILING POINT
Filed June 7, 1929
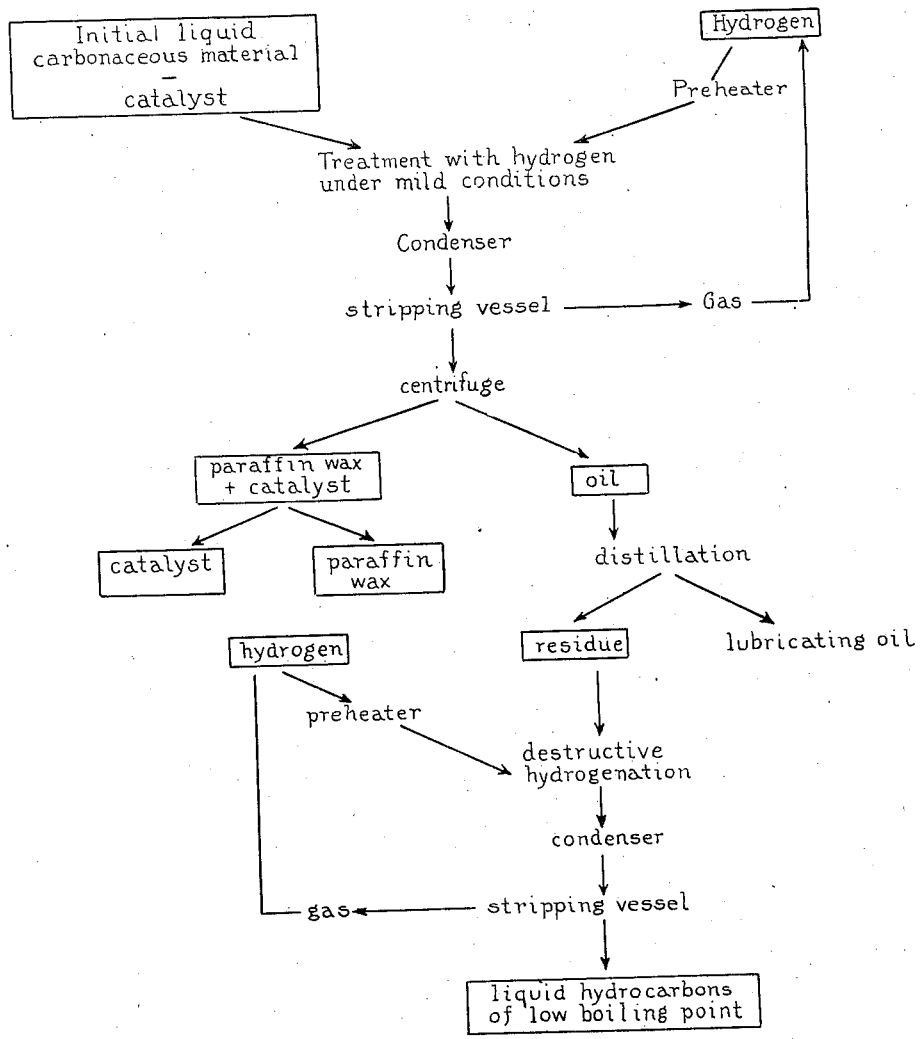
MATHIAS PIER
INVENTOR
BY Hauff-Ibarland
ATTORNEYS Patented June 21, 1932

1,863,670

UNITED STATES PATENT OFFICE

MATHIAS PIER, OF HEIDELBERG, GERMANY, ASSIGNOR, BY MESNE ASSIGNMENTS, TO STANDARD-I. G. COMPANY, OF LINDEN, NEW JERSEY, A CORPORATION OF DELAWARE

PRODUCTION OF VISCOUS OILS AND HYDROCARBON PRODUCTS OF LOW BOILING POINT

Application filed June 7, 1929, Serial No. 369,264, and in Germany June 18, 1928.

This invention relates to improvements in the manufacture and production of viscous oils and hydrocarbon products of low boiling point.

The conversion of liquid asphaltic carbonaceous materials such as pastes of coal of all varieties in oils, tars, mineral oils, distillation and extraction products of the same and the like into hydrocarbons of low boiling point, such as benzines, by means of hydrogen under pressure is a reaction which is sensitive to temperature. Especially when employing high temperatures there is the danger that the high molecular products of an asphaltic nature will form coke and other deposits which render the working up of the residues very difficult. Moreover by this method valuable high molecular products are lost, the recovery of which would increase the economy of the process.

I have now found that in the destructive hydrogenation of the said products it is not always advantageous to operate for a high percentage of products of low boiling point, but that it is preferable first to treat the initial materials with hydrogen or gases containing or supplying hydrogen under pressure under such mild conditions, in particular of temperature that the asphaltic substances or any sulphur compounds which are present or which have been formed are reduced and that any solid paraffins which are present or which have been formed are not destroyed. The products obtained, from which any constituents of low boiling points are distilled off, are then cracked or treated with hydrogen for the purpose of obtaining hydrocarbons of low boiling point or derivatives thereof, after separation of the fractions suitable for the preparation of viscous oils, such as lubricating oils and if desired of Diesel oils, and if necessary after separation of the paraffins, which may be separated for example by centrifuging.

The first treatment may be carried out for example at temperatures which are usually not much above 420° C. and temperatures of between about 300° and 440° C. are very suitable. Catalysts may be employed if desired, and the more active is the catalyst employed, the lower will be the temperature necessary. As a rule the higher the pressure, the higher must the temperature employed be. The first stage of the process may be carried out at atmospheric pressure or at elevated pressures, for example of 5, 10, 20, but preferably at 50, 100, 200 or even more atmospheres, for example at 500 or 1000 atmospheres. Low pressures may be employed with particular advantage when employing a catalyst comprising molybdenum. As examples of catalysts which may be employed in the process, for example in the first stage, may be mentioned catalysts immune from sulphur poisoning, for example such containing the elements of the 6th group of the periodic system, preferably together with such selected from the second to the fourth group. As specific examples of such hydrogenating catalysts immune from poisoning by sulphur may be mentioned, a catalyst prepared from the oxides of molybdenum, zinc and magnesium, or from tungstic and zinc oxide, or from the oxides of molybdenum and zinc, if desired, together with kaolin, or from the oxides of molybdenum and aluminium, or from molybdic acid, chromic acid and kaolin, or from tungstic acid, chromic acid, manganese dioxide and zinc sulphide, or from molybdic acid, chromic acid and Florida earth (aluminium hydrosilicate), or from tungstic acid, chromic acid and thorium oxide, or from chromic acid, nickel sulphide and aluminium hydrosilicate. Catalysts having a particularly mild action at low temperatures are such comprising molybdenum and zinc or tungstic acid and silica gel, or cobalt oxide or active charcoal, or molybdic acid on carriers, or molybdenum and magnesium. Besides the reduction of the asphaltic compounds, a substantial destructive hydrogenation of the other constitutents, for example to products of the nature of middle oils may also take place but it is essential that the solid paraffins remain substantially unchanged. The relative rigorosity of the treatment depends also on the nature of the initial materials. The more susceptible they are to the treatment the less rigorous need the treatment be. The duration of the treatment also has a considerable effect, since the rigorosity of the treatment increases with its duration. The rate of flow of the hydrogenating gas also has a very considerable influence. It is preferable then first to separate the solid paraffins, in so far as they are present, by the methods already known, for example by cooling to low temperatures or by means of solvents and subsequent precipitation by cooling or precipitants, and then the fractions which are mainly formed by reduction of the asphaltic substances and from which lubricating oils and if desired Diesel oils may be obtained.

In order to effect the reduction of the asphaltic substances and the subsequent separation of the fractions to be employed as lubricating oils it is essential to prevent the asphaltic constituents from prematurely separating in flocks. This is effected by working under such mild conditions that products of low boiling point similar to benzine are not formed to any great extent since these products cause the separation of flocks. Thus according to the nature of the initial materials the temperatures are kept correspondingly low. Also it is possible to repress the formation of the products of low boiling point by the choice of suitable catalysts. If desired constituents of the initial material which lead to the undesirable premature formation of benzines may be removed before the treatment according to the present invention.

The removal of the fractions suitable for the preparation of lubricating oils or of Diesel oils may be effected in any known manner, for example by distillation, for example by distilling off the fractions of lower boiling point, or by fractionation in vacuo or by steam distillation. It may further be effected by the employment of suitable solvents, in which for example the said constituents are soluble at high temperatures but insoluble at low temperatures. The said constituents may in some cases also be separated out by cooling to low temperatures.

Catalysts may be employed in both or in one of the stages. In the first stage it is preferable to work for example in the liquid phase, the catalysts either being stationary in the reaction chamber or being added in a finely divided state to the liquid products. In the latter case the catalysts may be separated, for example by filtration, and may be employed again. It is particularly advantageous to remove the catalyst from the fractions suitable for employment as lubricating oils, prior to rectifying them for example by distillation under reduced pressure.

In cases when the fractions separated for obtaining lubricating oils are not directly utilizable as lubricating oils, for example when they are fractions of middle oil nature, they may be further worked up into good lubricating oils by any known and suitable method, for example by treatment with chlorine or with catalysts having a condensing action, for example those of an alkaline nature, for example metals of the iron group or the oxides thereof activated by small additions of alkalines. Anhydrous halides of metals and metalloids may also be employed.

After separation of the paraffins and if desired of the Diesel oils and lubricating oils, the remaining products are subjected to a treatment for the production of low-boiling products, for example by cracking or by one or more treatments with hydrogen or gases containing or supplying hydrogen under pressure, if desired while separating valuable intermediate products such as benzines. The treatment in the second stage for the production of hydrocarbons of low boiling point is carried out at elevated temperatures, for example at temperatures ranging between 300° and 700° C. This said treatment may be carried out at atmospheric pressure or at elevated pressures, for example at pressures of up to 50 atmospheres but of course where practicable also higher pressures, for example 100, 200 atmospheres or even more may be employed. The employment of higher pressures is particularly advantageous when the cracking treatment takes the form of a destructive hydrogenation under conditions leading mainly to splitting of the molecule. A preferred method of carrying out the invention is illustrated by way of example in the accompanying flow sheet, but it should be understood that the invention is not limited to the method shown.

The following examples will further illustrate the nature of this invention but the invention is not restricted to these examples.

*Example 1*

Brown coal low temperature distillation tar containing about 44 per cent of constituents which boil up to 350° C. is treated with hydrogen under a pressure of 200 atmospheres and at a temperature of from 380° to 400° C. in a high pressure reaction vessel with the addition of a pulverulent catalyst containing molybdenum and zinc. The products leaving the reaction vessel are cooled and the liquid fraction is separated from the gaseous fraction.

About 70 per cent of the liquid fraction boils up to 350° C. The asphalt content has been reduced from 6 per cent to less than 1 per cent, and the solid paraffins remain unchanged and may be separated by centrifuging while cold. In this manner about 20 per cent of solid paraffins are obtained.

About 15 per cent of lubricating oils are obtained after distillation and these correspond to a good middle machine oil as regards their lubricating oil properties, as for example acid value, saponification value, viscosity, lubricating power and the like.

The remainder is middle oil and heavy oil which is converted into benzine in a second high pressure reaction vessel by treatment with hydrogen in the presence of catalysts in particular such having mainly a splitting action or by cracking and subsequent hydrogenation.

*Example 2*

Brown coal is subjected to a treatment with hydrogen at 400° C. and under a pressure of 200 atmospheres and in this manner, besides solid residues, a product of an aliphatic nature, rich in paraffins and having a high boiling point is obtained which contains about 40 per cent of the carbon originally present in the coal. After separating the constituents useful for obtaining lubricating oils and if desired Diesel oils, and the paraffins present which are solid when cold, the remaining residue, which consists of solid constituents and liquid carbonaceous constituents which cannot be worked up into lubricating and Diesel oils, is worked up into non-knocking motor fuel by treating the same afresh with hydrogen under pressure at a temperature of from 440° to 460° C. in the presence of a catalyst containing molybdenum and zinc. In this manner another 40 per cent of the carbon originally present in the coal is obtained in the form of a liquid product, mainly first as middle oil and heavy oil, which by further treatment with hydrogen or by cracking yields a non-knocking motor fuel.

What I claim is:—

1. A process for the production of viscous oils and hydrocarbon products of low boiling point from liquid asphaltic materials, which comprises treating said materials under such mild conditions, at temperatures of between 300° and 440° C. and pressures of the order of those employed in destructive hydrogenation with a gas comprising hydrogen, that any asphaltic substances are reduced and any paraffins present, which are normally solid at low temperatures, are not destroyed, separating from the resulting product the paraffins and those fractions suitable for the preparation of lubricating oils and subjecting the remainder of said product to a heat treatment leading mainly to the splitting of the molecules into hydrocarbon products of low boiling point.

2. A process as defined in claim 1 wherein the final heat treatment is effected at a temperature ranging from 300 to 700° C.

3. A process as defined in claim 1 wherein the final heat treatment is effected at a temperature of from 300 to 700° C., a pressure of the order of those employed in destructive hydrogenation and in the presence of hydrogen.

4. A process as defined in claim 1 wherein the initial treatment with hydrogen is effected in the presence of a catalyst immune to sulphur poisoning.

5. A process for the production of viscous oils and hydrocarbon products of low boiling point from liquid carbonaceous materials, which comprises treating brown coal low-temperature distillation tar to a treatment with hydrogen at a temperature of from 380° to 400° C. and under a pressure of 200 atmospheres in the presence of a pulverulent catalyst comprising molybdenum and zinc so that any asphaltic substances are reduced and any paraffins present which are normally solid at low temperatures are not destroyed, separating from the resulting product the paraffins, distilling the remainder of the product to separate the lubricating oils and subjecting the part remaining after the distillation to a heat treatment leading to a splitting of the molecules into low boiling hydrocarbons.

In testimony whereof I have hereunto set my hand.

MATHIAS PIER.